United States Patent

Jo et al.

(10) Patent No.: US 9,368,287 B2
(45) Date of Patent: Jun. 14, 2016

(54) DYE-SENSITIZED SOLAR CELL WITH METAL OXIDE LAYER CONTAINING METAL OXIDE NANOPARTICLES PRODUCED BY ELECTROSPINNING AND METHOD FOR MANUFACTURING SAME

(75) Inventors: Seong-Mu Jo, Seoul (KR); Dong-Young Kim, Seoul (KR); Sung-Yeon Jang, Seoul (KR); Nam-Gyu Park, Seoul (KR); Byoung-Hong Yi, Busan (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 1186 days.

(21) Appl. No.: 12/199,049

(22) Filed: Aug. 27, 2008

(65) Prior Publication Data

US 2009/0056808 A1     Mar. 5, 2009

(30) Foreign Application Priority Data

Aug. 29, 2007   (KR) .................. 10-2007-0087301

(51) Int. Cl.
*H01L 31/00* (2006.01)
*H01G 9/20* (2006.01)

(52) U.S. Cl.
CPC ........... *H01G 9/2031* (2013.01); *H01G 9/2059* (2013.01); *Y02E 10/542* (2013.01); *Y02P 70/521* (2015.11)

(58) Field of Classification Search
CPC ... H01G 9/2031; H01G 9/2059; Y02E 10/542
USPC ........................ 136/263; 438/57, 82
See application file for complete search history.

(56) References Cited

U.S. PATENT DOCUMENTS

| | | | | |
|---|---|---|---|---|
| 5,885,368 | A * | 3/1999 | Lupo et al. | 136/263 |
| 6,239,355 | B1 * | 5/2001 | Salafsky | 136/250 |
| 2002/0108649 | A1 * | 8/2002 | Fujimori et al. | 136/263 |
| 2005/0109385 | A1 * | 5/2005 | Kim et al. | 136/252 |

FOREIGN PATENT DOCUMENTS

KR      10-2006-0131552      12/2006

OTHER PUBLICATIONS

Machine translation of KR1020060131552, published on Dec. 20, 2006.*
Song et al., TiO2 single-crystalline nanorod electrode for quasi-solid-state dye-sensitized solar cells, Applied Physics Letters 87, 113113 (2005), pp. 1-3.*

* cited by examiner

*Primary Examiner* — Thanh-Truc Trinh
(74) *Attorney, Agent, or Firm* — NSIP Law (57) ABSTRACT

A dye-sensitized solar cell having improved photoelectric conversion characteristic includes a metal oxide layer having dye-adsorbed metal oxide nanoparticles, wherein the metal oxide nanoparticles are formed by electrospinning a mixed solution of a metal oxide precursor and a polymer into ultrafine composite fibers, and thermally compressing and sintering the ultrafine composite fibers.

17 Claims, 6 Drawing Sheets

DYE-SENSITIZED SOLAR CELL WITH METAL OXIDE LAYER CONTAINING METAL OXIDE NANOPARTICLES PRODUCED BY ELECTROSPINNING AND METHOD FOR MANUFACTURING SAME

CROSS-REFERENCE TO RELATED APPLICATION

This application claims the benefit under 35 U.S.C. §119 (a) of a Korean Patent Application No. 10-2007-0087301, filed on Aug. 29, 2007 in the Korean Intellectual Property Office, the entire disclosure of which is hereby incorporated by reference.

TECHNICAL FIELD

The following description relates to a dye-sensitized solar cell and a method for manufacturing the same, and more particularly, a dye-sensitized solar cell whose photoelectric conversion characteristic may be improved by increasing porosity and dye adsorption amount of a metal oxide layer and a method for manufacturing same.

BACKGROUND

An exemplary dye-sensitized solar cell was first announced by Gratzel research team, Switzerland (B. O'Regan, M. Gratzel, Nature 353, 737 (1991)). Since then, extensive research has been made with respect of a dye-sensitized solar cell.

Figure 1:
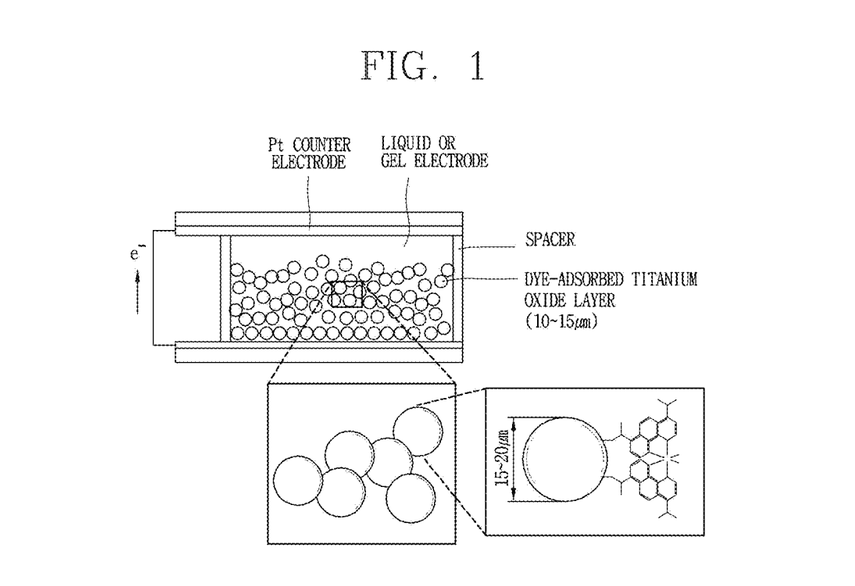
FIG. 1 is a schematic view illustrating a conventional dye-sensitized solar cell.

Referring to FIG. 1, a dye-sensitized solar cell developed by M. Gratzel, et al. includes an metal oxide semiconductor electrode composed of a photosensitive dye capable of absorbing a visible ray to generate electron-hole pairs and nonocrystalline titanium oxide particles that can transfer the generated electrons. More specifically, electrons excited in the dye by irradiation of the visible ray are transferred through the titanium oxide particles, which is an n-type semiconductor, and the dye is regenerated by an electrochemical oxidation-reduction reaction of "$I^-/I_3^-$" contained in a liquid electrolyte, thereby generating an electric current.

The above dye-sensitized solar cell may be manufactured in a cost-effective manner as compared to a monocrystalline silicon solar cell, an amorphous silicon solar cell, and a chemical compound semiconductor solar cell, all of which are well-known in the art. For that reason, attention has been paid to the dye-sensitized solar cell as a next-generation solar cell.

However, the dye-sensitized solar cell available at the present time is lower in photo-energy conversion efficiency than the silicon solar cell and the chemical compound semiconductor solar cell. This means that an increase in the photo-energy conversion efficiency is required to render the dye-sensitized solar cell practically usable.

As one of solutions to this problem, there is known a method in which light absorption efficiency of a metal oxide layer is sharply increased to obtain a high short-circuit current density (Jsc). To this end, it may be necessary to increase the adsorption amount of a dye to the metal oxide layer so that the dye may efficiently absorb incident light. In a typical dye-sensitized solar cell, the metal oxide layer is made porous to have an increased surface area. More specifically, such a porous titanium oxide layer is prepared by dispersing in ethanol 10 to 50 nm-sized anatase crystalline titanium oxide particles produced by hydrothermal synthesis of titanium alkoxide, adding an organic polymer or oligomer binder to produce a paste, and coating the paste on a transparent conductive substrate, followed by sintering. Such formation of the porous titanium oxide layer is performed by various kinds of general-purpose thin film formation methods, including a roller method, an air knife method, a blade method, a wire bar method, a spin method, and a spray method (see, for example, JP2006-286528A).

In this regard, where the titanium oxide particles have a size of 10 nm or less, they show an increase in specific surface area but may suffer from reduction in particle crystallinity and charge transportation efficiency. In contrast, where the size of the titanium oxide particles is large, the specific surface area thereof may be sharply reduced together with an accompanying decrease in the dye adsorption amount. This may result in sharp reduction in the photoelectric conversion efficiency of the dye-sensitized solar cell. Consequently, a porous titanium oxide layer composed of titanium oxide particles with a size of 10 to 20 nm is generally used to assure efficient light absorption.

Where the porosity of the porous titanium oxide layer is increased by reducing the density thereof, the increase of the specific surface area may be achieved, which brings out increase of the dye adsorption amount, but lowering of the charge transportation efficiency due to the increase in inter-particle resistance. In contrast, where the porosity of the porous titanium oxide layer is reduced by increasing the density thereof, the dye adsorption amount may be decreased.

In case of conventionally available titanium oxide nanoparticles, individual crystals forming polycrystalline structures of the nanoparticles have a reduced size and random crystal faces. Accordingly, the titanium oxide nanoparticles show a reduced electron transportation capability and an unsatisfactory conductivity.

As a consequence, a conventional solar cell with a titanium oxide layer composed of titanium oxide nanoparticles may have a limit in assuring maximized light absorption and greatly improving photoelectric conversion efficiency.

SUMMARY

Accordingly, according to an aspect, there is provided a dye-sensitized solar cell capable of increasing a dye adsorption amount per unit weight of metal oxide nanoparticles, allowing a metal oxide layer to have high porosity so that a liquid electrolyte, a gel-type electrolyte or a solid electrolyte may infiltrate into the metal oxide layer with great ease, and/or enabling the metal oxide layer to have high electron transportation capacity so that the solar cell may enjoy improved photoelectric conversion characteristic, and a method for manufacturing same.

According to another aspect, there is provided diversified and concrete methods for controlling the density and dye adsorption amount of a metal oxide layer (hereinafter, sometimes referred to as a "semiconductor layer").

According to still another aspect, there is provided a dye-sensitized solar cell comprising a semiconductor electrode including a substrate and a metal oxide layer formed on the substrate, the metal oxide layer comprising dye-adsorbed metal oxide nanoparticles, a counter electrode spaced apart from the semiconductor electrode, and an electrolyte provided between the semiconductor electrode and the counter electrode, wherein the metal oxide nanoparticles are formed by electrospinning a mixed solution of a metal oxide precursor and a polymer into ultrafine composite fibers, and thermally compressing and sintering the ultrafine composite fibers.

According to yet another aspect, there is provided a method for manufacturing a dye-sensitized solar cell, comprising preparing a semiconductor electrode, preparing a counter electrode, and providing an electrolyte between the semiconductor electrode and the counter electrode, wherein the preparing of the semiconductor electrode comprises electrospinning a mixed solution of a metal oxide precursor and a polymer to form ultrafine composite fibers made of the metal oxide precursor and the polymer, thermally compressing and then sintering the ultrafine composite fibers to remove the polymer therefrom, forming a metal oxide layer composed of metal oxide nanoparticles, and allowing a dye to be adsorbed to the metal oxide nanoparticles.

The density of the metal oxide layer defined by a ratio of a weight of the metal oxide nanoparticles per unit volume of the metal oxide layer may be in a range of 0.5 g/cm$^3$ to 1.8 g/cm$^3$, and the dye adsorption amount per unit gram of the metal oxide nanoparticles may be in a range of $6 \times 10^{-5}$ to $5 \times 10^{-4}$ mole.

The density of the metal oxide layer may be controlled by 1) adjusting the weight ratio of the metal oxide precursor and the polymer in the mixed solution, 2) adjusting the diameter of the ultrafine composite fibers by changing at least one of the viscosity and the ejection speed of the mixed solution, 3) adjusting the thermal compression ratio, or 4) using at least two of methods 1) to 3) in combination.

Other features and aspects may be apparent from the following detailed description, the drawings, and the claims.

BRIEF DESCRIPTION OF THE DRAWINGS

Throughout the drawings and the detailed description, unless otherwise described, the same drawing reference numerals will be understood to refer to the same elements, features, and structures.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Titanium oxide nanoparticles will be described herein as an example of metal oxide nanoparticles for ease of comparison with the prior art. Accordingly, it is understood that the teachings provided herein are not limited thereto and that the teachings may be equally applicable in case where zinc oxide, tin oxide, niobium oxide, tungsten oxide, strontium oxide, zirconium oxide, a mixture thereof and the like are used in place of titanium oxide.

Although an electrospinning method is used to produce ultrafine composite fibers, this is merely an example described herein and not limited thereto. For example, in addition to the typical electrospinning method, various kinds of other methods that can spin a solution using electric fields may be used. Examples of other spinning methods employable include a melt-blown method using electric fields, an electro-blown method, a flash spinning method using electric fields and an electrostatic melt-blown method.

An example of a dye-sensitized solar cell will now be described.

Figure 2:
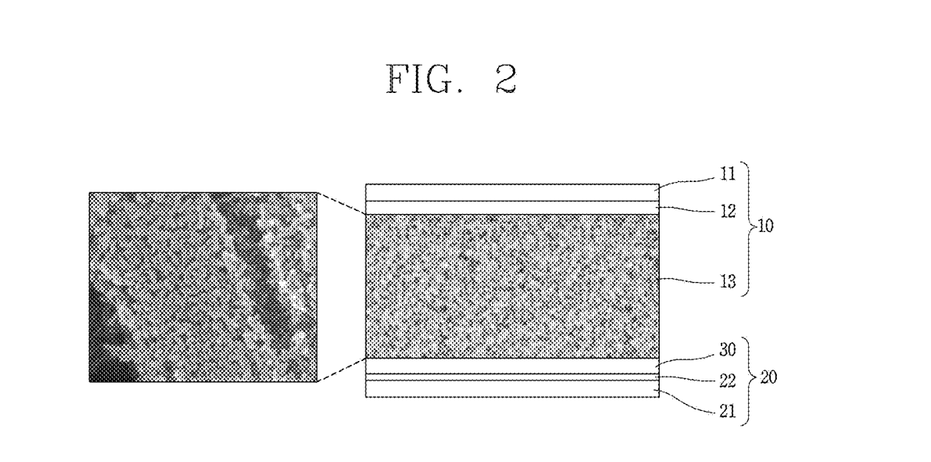
FIG. 2 is a schematic view showing an example of a dye-sensitized solar cell.

Referring to FIG. 2, an example of a dye-sensitized solar cell comprises a semiconductor electrode 10, a counter electrode 20, and an electrolyte 30 filled between the electrodes 10 and 20.

The semiconductor electrode 10 is a cathode and may be sometimes called a photoelectrode. The semiconductor electrode 10 comprises a substrate 11 and a metal oxide layer 13 formed on the substrate 11, the metal oxide layer 13 containing metal oxide nanoparticles. A dye is adsorbed to the metal oxide nanoparticles.

A transparent conductive substrate may be used as the substrate 11. The transparent conductive substrate may be a transparent glass substrate or a transparent flexible polymer substrate having a conductive thin film coated thereon. In this regard, the conductive substrate may be, e.g., an indium tin oxide (ITO) film, a F-doped tin oxide (FTO) film or an ITO film coated with antimony tin oxide (ATO) or F-doped tin oxide.

The metal oxide layer 13 contains metal oxide nanoparticles which are formed by electrospinning a mixed solution of a metal oxide precursor and a polymer into ultrafine composite fibers, and subjecting the ultrafine composite fibers to a heat treatment (sintering) after thermal compression thereof. According to an aspect, a ruthenium-based dye or a coumarin-based organic dye may be used as the dye adsorbed to the metal oxide nanoparticles. However, it is not limited thereto.

According to an aspect, the density of the metal oxide layer 13 defined by a ratio of a weight of the metal oxide nanoparticles per unit volume of the metal oxide layer 13 is in a range of 0.5 g/cm$^3$ to 1.8 g/cm$^3$. The adsorption amount of the dye per unit gram of the metal oxide nanoparticles is in a range of $6 \times 10^{-5}$ to $5 \times 10^{-4}$ mole. In addition, the porosity of the metal oxide layer 13 is in a range of 65 to 90%. The metal oxide nanoparticles are monocrystalline and have a diameter ranging from 5 to 20 nm. The metal oxide nanoparticles have an aspect ratio of 1 to 50. Also the metal oxide layer 13 has a thickness of 5 to 20 µm. Further description will follow regarding the metal oxide layer 13.

The dye-sensitized solar cell may further comprise a blocking layer 12 disposed between the substrate 11 and the metal oxide layer 13. The blocking layer 12 may serve to enhance adhesion between the substrate 11 and the metal oxide layer 13 while allowing electrons to be smoothly transferred from the metal oxide layer 13 to the substrate 11. Another function of the blocking layer 12 may be to control leakage of electrons from the substrate 11, thereby enhancing the energy conversion efficiency.

The counter electrode 20 as an anode comprises a substrate 21 and a platinum layer 22 coated thereon. The transparent conductive substrate mentioned above may be used as the substrate 21. A layer made of carbon particles, a conductive polymer or a mixture thereof may be used in place of the platinum layer 22.

The electrolyte 30 is filled in the empty space between the electrodes 10 and 20, and the pores of the metal oxide layer 13 of the semiconductor electrode 10. A liquid electrolyte, a gel-type electrolyte or a solid electrolyte may be used as the electrolyte 30.

Next, an example of a method for manufacturing the dye-sensitized solar cell will be described below.

The method for manufacturing the dye-sensitized solar cell comprises preparing a semiconductor electrode, preparing a counter electrode, assembling the two electrodes together and injecting an electrolyte between the two electrodes. Since the counter electrode preparing step and the assembling step are well-known in the art, only the semiconductor electrode preparing step will be described hereinbelow.

In order to prepare the semiconductor electrode, a mixed solution of a metal oxide precursor and a polymer is first electrically spun to produce ultrafine composite fibers composed of the metal oxide precursor and the polymer.

The metal oxide precursor may be of any type, if it contains ions of titanium, zinc, tin, niobium, tungsten, strontium or zirconium and can form titanium oxide, zinc oxide, tin oxide, niobium oxide, tungsten oxide, strontium oxide or zirconium oxide when mixed with the polymer, electrically spun and then sintered.

The polymer used may be at least one selected from the group consisting of polyurethane (PU), polyether urethane, polyurethane copolymer, cellulose acetate, cellulose acetate butyrate, cellulose acetate propionate, polymethyl methacrylate (PMMA), polymethyl acrylate (PMA), polyacrylic copolymer, polyvinyl acetate (PVAc), polyvinyl acetate copolymer, polyvinyl alcohol (PVA), polyfurfuryl alcohol (PFFA), polystyrene (PS), polystyrene copolymer, polyethylene oxide (PEO), polypropylene oxide (PPO), polyethylene oxide copolymer, polypropylene oxide copolymer, polycarbonate (PC), polyvinylchloride (PVC), polycaprolactone (PCL), polyvinylpyrrolidone (PVP), polyvinylidene fluoride (PVdF), polyvinylidene fluoride copolymer and polyamide, and copolymers thereof.

According to an aspect, the weight ratio of the metal oxide precursor to the polymer (the metal oxide precursor/polymer weight ratio) is in a range of 0.1 to 20 and further that the ultrafine composite fibers has a diameter of 10 to 10,000 nm.

Then, the ultrafine composite fibers are thermally compressed and sintered to remove the polymer therefrom, thus forming a metal oxide layer composed of metal oxide nanoparticles.

According to an aspect, the thermal compression is carried out at a temperature not less than the glass transition temperature (Tg) but no greater than the melting temperature (Tm) of the polymer, and further that the thermal compression is performed at a compression ratio of 0.1 to 20 ton per 100 cm$^2$. By virtue of such thermal compression, the polymer in the ultrafine composite fibers is melt partly or in its entirety. Fine fibrils forming the ultrafine composite fibers are crushed so that the specific surface area thereof may be increased. This enhances adhesion between the crushed fibrils and the substrate.

According to an aspect, the sintering is performed at a temperature of 400 to 600° C. The polymer previously melted through the thermal compression is removed by the sintering, thereby producing a metal oxide layer composed of metal oxide nanoparticles.

The metal oxide nanoparticles thus produced are monocrystalline and have a diameter ranging from 5 to 20 nm. According to an aspect, the metal oxide nanoparticles have an aspect ratio of 1 to 50. Also, the metal oxide layer has a thickness of 5 to 20 µm. The density of the metal oxide layer 13 is in a range of 0.5 to 1.8.

Subsequently, a dye is adsorbed to the metal oxide nanoparticles. The adsorption amount of the dye per unit gram of the metal oxide nanoparticles may be in a range of $6 \times 10^{-5}$ to $5 \times 10^{-4}$ mole.

Hereinafter, a dye-sensitized solar cell including a titanium oxide layer as the metal oxide layer will be described by way of example in an effort to more specifically describe the exemplary embodiment.

A titanium oxide precursor solution, in which a polymer is dissolved, is directly electrically spun against a transparent conductive substrate for a dye-sensitized solar cell to form ultrafine composite fibers made of the polymer and the titanium oxide precursor. The substrate coated with the ultrafine composite fibers is compressed under a specified pressure at a temperature between the glass transition temperature (Tg) and the melting temperature (Tm) of the polymer. The substrate thus compressed is sintered for a specified time at a temperature of 400 to 600° C. to remove the polymer. Thus, a porous titanium oxide layer composed of anisotropic titanium oxide nanoparticles is quite firmly formed on the transparent conductive substrate.

Figure 9:
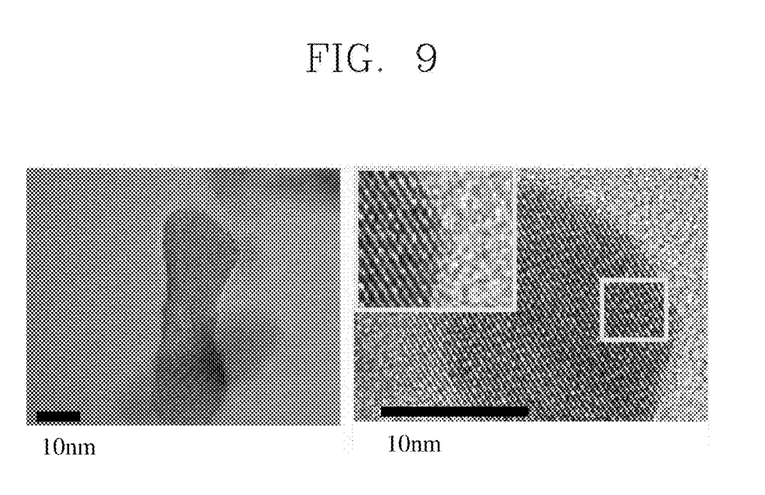
FIG. 9 shows high-resolution transmitting electron microscopic pictures illustrating an anisotropic titanium oxide nanoparticle layer produced according to Example 1-3.

The titanium oxide nanoparticles thus produced has a diameter of about 5 to 20 nm and a length of 20 nm or more, which means that they are of an anisotropic form whose aspect ratio is in a range of 1 to 50 (see FIG. 9). The titanium oxide nanoparticles are of anatase type crystals and are monocrystalline. The crystal faces of the titanium oxide nanoparticles are highly regular and are exposed as they stand.

Conventional titanium oxide nanoparticles used in forming a dye-adsorbing titanium oxide layer of a typical dye-sensitized solar cell exhibit a reduced electron transportation capacity and an unsatisfactory conductivity. This may be because individual crystals forming the polycrystalline nanoparticles are small in size and have random crystal faces. Where the porosity of the porous titanium oxide layer is increased by reducing the density thereof, the increase of the specific surface area is achieved, which brings out increase of the dye adsorption amount, but lowering of the charge transportation efficiency due to the increase in inter-particle resistance. In contrast, where the porosity of the porous titanium oxide layer is reduced by increasing the density thereof, the dye adsorption amount is decreased. In this regard, where the titanium oxide nanoparticles have a size of 10 nm or less, they show an increase in specific surface area but suffer from reduction in particle crystallinity and charge transportation efficiency. Where the titanium oxide nanoparticles have an increased size, the specific surface area is sharply reduced together with an accompanying decrease in the dye adsorption amount. This results in sharp reduction in the photoelectric conversion efficiency of the dye-sensitized solar cell. Consequently, a porous titanium oxide layer composed of titanium oxide nanoparticles with a size of 10 to 20 nm is generally used to assure efficient light absorption.

Because the anisotropic titanium oxide nanoparticles of the example have an anatase-type monocrystalline structure, they may be superior in terms of the electron transportation capacity and dye adsorption amount as compared to the conventional titanium oxide nanoparticles.

According to a general aspect, the titanium oxide layer composed of the anisotropic titanium oxide nanoparticles and showing the increased photoelectric conversion efficiency is completed by controlling the density and apparent porosity thereof. The density of the titanium oxide layer is 0.5 to 1.8, preferably 0.8 to 1.5. The apparent porosity of the titanium oxide layer is 65 to 90%, preferably 65 to 80%. The dye adsorption amount of the titanium oxide layer per unit gram of the titanium oxide nanoparticles decided by UV absorbance analysis is $6 \times 10^{-5}$ to $5 \times 10^{-4}$ mole, preferably $6 \times 10^{-5}$ to $2 \times 10^{-4}$ mole.

Given the same titanium oxide density and the same apparent porosity, the dye adsorption amount of the anisotropic titanium oxide nanoparticle layer (i.e., the titanium oxide layer) according to a general aspect is 1.5 to 2.5 times as great as that of the conventional titanium oxide nanoparticle layer. This is because the anisotropic titanium oxide nanoparticles according to a general aspect have a monocrystalline characteristic, namely because the nanoparticles have crystal faces regularly exposed on their surfaces.

The anisotropic titanium oxide nanoparticle layer according to a general aspect is superior in the photoelectric conversion efficiency compared to a conventional titanium oxide nanoparticle layer, despite the fact that the nanoparticle layer is quite low in the density and quite high in the apparent porosity as compared to the conventional nanoparticle layer. This is because the nanoparticle layer according to a general aspect exhibits an enhanced electron transportation characteristic due to the monocrystalline structure of the anisotropic titanium oxide nanoparticles.

Due to the superiority in the dye adsorption characteristic, the electron transportation characteristic and the apparent porosity offered by the anisotropic titanium oxide nanoparticle layer according to a general aspect, it is possible to maintain the photoelectric conversion efficiency of the dye-sensitized solar cell attained by use of a gel-type electrolyte or a solid electrolyte equal to or greater than 80% of that available when a liquid electrolyte is used. In contrast, with a conventional dye-sensitized solar cell having a titanium oxide layer composed of titanium oxide nanoparticles, the photoelectric conversion efficiency available in the case of using a gel-type electrolyte or a solid electrolyte may be no more than 70% of that attainable by use of a liquid electrolyte.

In the dye-sensitized solar cell having the anisotropic titanium oxide nanoparticle layer according to a general aspect, the photoelectric conversion efficiency measured through the use of a mask is reduced by not more than 20% as compared to the photoelectric conversion efficiency available when the mask is not in use. In case of the dye-sensitized solar cell having the conventional titanium oxide nanoparticle layer, however, the photoelectric conversion efficiency measured through the use of a mask is reduced by 20% or more.

It is understood that the density and apparent porosity of the titanium oxide layer composed of the anisotropic titanium oxide nanoparticles, and showing the increased photoelectric conversion efficiency, may be controlled by many different methods.

For example, the density and apparent porosity of the titanium oxide layer may be controlled by adjusting the weight ratio of a titanium oxide precursor (e.g., titanium alkoxide) and a polymer in an electrospinning solution. Where the content of the polymer is high, the titanium oxide layer shows decreased density and increased apparent porosity. In contrast, where the polymer content is low, the titanium oxide layer shows increased density and decreased apparent porosity. Accordingly, the weight ratio of the titanium alkoxide and the polymer may be 0.1 to 20, preferably 0.5 to 10.

The diameter of polymer-titanium oxide ultrafine composite fibers produced by electrospinning affects the density and apparent porosity of the titanium oxide layer. In other words, where the diameter of the polymer-titanium oxide ultrafine composite fibers grows smaller, the density of the ultrafine composite fiber layer deposited on the transparent conductive substrate through electrospinning becomes greater. This is because the size of pores in the ultrafine composite fibers is reduced as the fiber diameter grows smaller. The anisotropic titanium oxide nanoparticle layer produced by compressing and sintering the ultrafine composite fiber layer at a specified temperature exhibits increased density and reduced apparent porosity.

The diameter of the ultrafine composite fibers may be decided by various process parameters during electrospinning such as the viscosity of the electrospinning solution (i.e., the polymer content), the ejection speed of the electrospinning solution and the like. According to an aspect, the ejection speed of the electrospinning solution is controlled to control the density and apparent porosity of the anisotropic titanium oxide nanoparticle layer. The ejection speed is 1 to 500 µl/min, preferably 10 to 200 µl/min for every spinning nozzle. Where the ejection speed is less than 1 µl/min, productivity may be reduced to an unacceptable degree. Where the ejection speed exceeds 500 µl/min, a problem is posed in that the fiber diameter becomes too great, thereby making it difficult to control the apparent porosity. Although the diameter of the fibers produced at a high ejection speed of 100 to 200 µl/min is equal to or greater than 1 m, no severe reduction occurs in the photoelectric conversion efficiency of the titanium oxide layer produced by compressing and sintering the fibers. This is because the ejection speed may not affect the size of the anisotropic nanoparticles of the sintered fibers. In view of this, the diameter of the polymer-titanium oxide ultrafine composite fibers produced by electrospinning according to a general aspect is in a range of 10 to 10,000 nm, preferably 50 to 2,000 nm.

The density and apparent porosity of the titanium oxide layer may be controlled by adjusting the compression ratio when the polymer-titanium oxide ultrafine composite fibers produced by electrospinning are compressed at a specified temperature prior to sintering the same. According to an aspect, the fibers are compressed at a compression ratio of 0.1 to 20 ton, preferably 0.1 to 10 ton per 100 $cm^2$.

It is equally possible to control the density and apparent porosity of the titanium oxide layer by using the afore-mentioned methods in combination.

In an effort to increase the short-circuit current density (Jsc), titanium chloride ($TiCl_4$) may be additionally adsorbed to the surface of the anatase-type titanium oxide nanoparticle layer to which a dye is absorbed in advance. Then, the resulting nanoparticle layer may be subjected to sintering, achieving further coating with a rutile-type titanium oxide layer.

Next, description will be made on an example of a method for manufacturing the dye-sensitized solar cell having the titanium oxide layer produced by electrospinning.

In order to produce a metal oxide semiconductor electrode as a negative pole, an electrospinning solution is prepared.

To this end, for example, polyvinyl acetate having good affinity to titanium oxide is dissolved in a solvent of dimethylformamide, acetone, tetrahydrofuran, toluene or a mixture thereof to prepare 5 to 20 wt % of a polymer solution with a viscosity suitable for electrospinning. The polyvinyl acetate used at this time has a weight-average molecular weight of 100,000 to 1,000,000 g/mol. The polymer solution may be prepared by using polyvinyl pyrolidone, polyvinyl alcohol, polyethylene oxide or the like in place of polyvinyl acetate. However, this is merely an example and not limited thereto, and other polymers may be used as long as, for example, they do not leave any residual carbon component after sintering and have a glass transition temperature (Tg) of 150° C. or less.

Then, titanium isopropoxide is added to the polymer solution in an amount of 5 to 25% by weight of polyvinyl acetate. Acetic acid as a catalyst is added to the polymer solution in an amount of 20 to 60% by weight of titanium isopropoxide, after which the polymer solution is allowed to react for one to five hours at room temperature.

Figure 3:
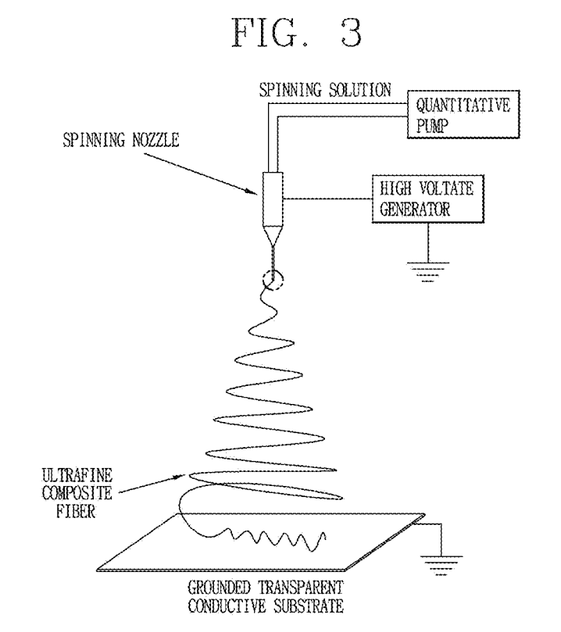
FIG. 3 is a schematic view illustrating an example of an electrospinning device.

Thereafter, the electrospinning solution thus prepared is electrospun on a transparent conductive substrate by use of an electrospinning device shown in FIG. 3, thereby producing ultrafine composite fibers.

Referring to FIG. 3, an example of the electrospinning device includes a spinning nozzle connected to a quantitative pump that may quantitatively supply the solution, a high voltage generator and a transparent conductive substrate on which an electrospun composite fiber layer is to be formed. The transparent conductive substrate is grounded and coated with indium tin oxide or F-doped tin oxide. The transparent conductive substrate has electric conductivity of 5 to 30Ω and is used as a cathode. The quantitative pump is of the type whose discharge volume per unit time is variable. The spinning nozzle is attached to the pump and is used as an anode. Ultrafine polymer-titanium oxide composite fibers with varying diameters are produced by applying a voltage of 10 to 30 KV to the spinning nozzle and controlling the ejection speed of the electrospinning solution within a range of 1 to 500 μl/min.

Subsequently, the ultrafine composite fibers are thermally compressed and sintered to produce a titanium oxide layer from which the polymer is removed.

More specifically, the transparent conductive substrate having the ultrafine polymer-titanium oxide composite fibers deposited thereon is compressed into a thickness of 5 to 20 μm under a specified pressure at a temperature not less than the glass transition temperature (Tg) but no greater than the melting temperature (Tm) of the polymer. Then, the transparent conductive substrate thus pre-treated is sintered in the air at a temperature of 400 to 600° C. for example for thirty minutes, whereby the residual polymer is completely removed by thermal decomposition and the crystal structure of titanium oxide nanoparticles is converted to an anatase type.

Next, a dye is adsorbed to the titanium oxide layer produced in the manner.

More specifically, the transparent conductive substrate having the anisotropic titanium oxide nanoparticle layer thus produced is dipped for twelve or more hours in an ethyl alcohol solution in which ruthenium-based dye molecules (e.g., an N719 dye in a concentration of $3 \times 10^{-4}$ M) are dissolved, so that the dye can be adsorbed to the transparent conductive substrate having the anisotropic titanium oxide nanoparticle layer. Thereafter, the substrate is washed with ethyl alcohol and dried, thereby producing a semiconductor electrode to which the dye is absorbed.

Then, a platinum layer is coated on a transparent conductive glass substrate coated with indium tin oxide or F-doped tin oxide in order to produce a counter electrode as an anode. Other coating layers composed of carbon particles, conductive polymers or a mixture thereof may be used in place of the platinum layer.

Next, the counter electrode as an anode and the semiconductor electrode as a cathode are assembled together so that the conductive surfaces thereof may lie inwardly. In other words, the platinum layer and the titanium oxide layer are arranged to face with each other. At this time, the counter electrode and the semiconductor electrode are combined together at a temperature of 120° C. in a state that a spacer of about 20 μm in thickness made of Surlyn (a thermoplastic product of E.I. du Pont de Nemours & Company) is interposed between the electrodes.

Next, a liquid electrolyte or a polymer gel electrolyte is filled in the space between the electrodes. As the liquid electrolyte, it is possible to use an electrolyte composed of, e.g., a mixed solution of 0.6M hexyldimethyl imidazolium iodine, 0.1M guanidine thiocyanate, 0.03M iodine, 4-tert-butylpyridine and acetonitrile-valeronitrile. As the polymer gel electrolyte, it is possible to use an electrolyte containing one or more polymer selected from the group consisting of poly (vinylidene fluoride)-co-poly(hexafluoropropylene), poly (acrylonitrile), poly(ethylene oxide) and poly(alkylacrylate). According to an aspect, the polymer gel electrolyte contains one or more of the above-noted polymers in an amount of 5 to 20 wt % based on the total weight of a mixed solvent of propylene carbonate and ethylene carbonate.

Hereinafter, a number of Examples are presented below for illustration only.

[Decision of Dye Adsorption Amount]

The dye adsorption amount may be determined according to a method disclosed in J. Solid State Chemistry 178 (2005) 1044 and J. Phys. Chem. B. 2003, 107, 8981.

First, the ultraviolet absorbance of a solution in which a dye is dissolved in a predetermined concentration was measured and an analytical measuring curve was obtained by plotting the dye concentration against the ultraviolet absorbance. Then, the ultraviolet absorbance of a specimen was measured and the dye adsorption amount of the specimen was decided using the analytical curve.

1. Drawing of Analytical Measuring Curve

Prepared first were an aqueous solution of 0.1 N NaOH and a solution of 0.2 mM ruthenium-based dye (an N3 dye [Ru535] or an N719 dye [Ru535-bis TBA]) dissolved in ethanol. The solution of 0.2 mM ruthenium-based dye was added to the aqueous solution of 0.1 N NaOH to prepare solutions of different concentrations. The ultraviolet absorbance of these solutions each was measured.

Figure 4:
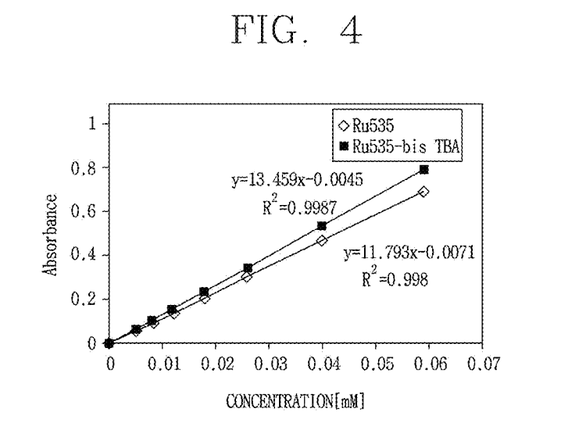
FIG. 4 illustrates an example of an analytical measuring curve obtained by plotting different concentrations of dye solutions against ultraviolet absorbance.

Blanks were decided using the aqueous solution of 0.1 N NaOH and the ethanol solution obtained by excluding the dye from the solutions of different concentrations. Then, an analytical measuring curve was drawn and shown in FIG. 4.

2. Decision of Dye Adsorption Amount of Specimen

An electrode produced by forming a titanium oxide layer on a transparent conductive substrate was dipped in a dye solution so that the dye may be adsorbed to the electrode. Then, a specimen was prepared by cutting the electrode into a size of 1 cm by 1 cm. The dye-adsorbed titanium oxide layer was scraped away from the transparent conductive substrate with a razor to measure the weight thereof. The titanium oxide scraps were dipped in the aqueous solution of 0.1 N NaOH. After a specified desorption time has lapsed, the absorbance of the titanium oxide scraps at $\lambda_{max}=498$ nm was measured using an ultraviolet absorbance analyzer (Hewlett-Packard 8453/vision inspection system spectrophotometer). Then, the dye concentration of the solution was decided using the analytical curve, and the amount of adsorbed dye per unit weight of the titanium oxide scraps was determined based on the dye concentration of the solution.

[Decision of Density of Titanium Oxide Layer]

The density of the titanium oxide layer was calculated from the ratio of the weight of the titanium oxide nanoparticles to the unit volume of the titanium oxide layer.

[Decision of Apparent Porosity of Titanium Oxide Layer]

The apparent porosity of the titanium oxide layer formed on the transparent conductive substrate was calculated from the equation: apparent porosity (%)=[(V−$V_{TiO2}$)/V]×100, where V is the total volume (thickness by area) of the titanium oxide layer and $V_{TiO2}$ is the titanium oxide volume obtained from the density of titanium oxide crystals and the weight of the titanium oxide contained in the titanium oxide layer. In this regard, the thickness of the titanium oxide layer was measured using a surface profiler (TENCOR.P-10).

The morphology of the specimen was obtained using a field emission scanning electron microscope (FE-SEM, HITACHIS-4100) and a high-resolution transmitting electron microscope (HR-TEM, JEOLJEM-2000EXII). The specific surface area of the specimen was decided by a BET method (Sorptomatic 1990) in which the specific surface area is measured by liquid nitrogen adsorption.

[Manufacture of Dye-Sensitized Solar Cell]

A dye was adsorbed to a titanium oxide layer formed on a transparent conductive substrate. More specifically, a transparent conductive substrate having a titanium oxide layer was dipped for twelve hours in an ethanol solution in which a ruthenium-based dye (N719) is dissolved in a concentration of $3\times10^{-4}$M, whereby the dye was adsorbed to the titanium oxide layer. Thereafter, a semiconductor electrode was produced by washing the substrate with ethanol several times and drying the same.

Then, a counter electrode was produced by coating a platinum layer on a transparent conductive substrate coated with F-doped tin oxide.

Next, the semiconductor electrode and the counter electrode were combined together with a small pressure at a temperature of 120° C., with a spacer of about 20 μm in thickness interposed therebetween. Then, an iodine-based liquid electrolyte was filled in the space between the electrodes, after which the space was sealed off to obtain a dye-sensitized solar cell. The liquid electrolyte was composed of a mixed solution of 0.6M hexyldimethyl imidazolium iodine, 0.1M guanidine thiocyanate, 0.03M iodine, 4-tert-butylpyridine and acetonitrile-valeronitrile.

[Evaluation of Photoelectric Conversion Characteristic of Dye-sensitized Solar Cell]

The photoelectric conversion characteristic of the dye-sensitized solar cell was evaluated using the Keithley 2400 source measurement unit. A class A solar simulator xenon lamp (Yamashita Denso, 1000W) was used as a light source. The light intensity was controlled under an AM-1.5 illumination condition using a silicon reference solar cell equipped with the KG-5 filter (Fraunhoffer Institute, Germany). Measurements of the specimens are all performed under a global AM1.5 illumination condition with the light intensity of 100 mW/cm².

Comparative Example 1

Solaronix titanium oxide paste (Ti-Nanoxide D, Solaronix) containing 12% nanocrystals was applied on a transparent conductive substrate by virtue of a doctor blade method, thereby producing a paste film. The paste film was sintered at 500° C. to produce a titanium oxide layer of 7 μm in thickness (Comparative Example 1-1) and a titanium oxide layer of 12.2 μm in thickness (Comparative Example 1-2). The apparent porosity and dye adsorption amount of these titanium oxide layers are shown in Table 1.

TABLE 1

| Com. Ex. | Titanium Oxide Layer | | | | | Total TiO$_2$ Cont. ($10^{-3}$ g) | Amount of Adsorbed Dye ($1 \times 10^{-8}$ mole) | Amount of Adsorbed Dye | |
|---|---|---|---|---|---|---|---|---|---|
| | Thickness (μm) | Area (cm²) | Porosity (%) | Specific Surface Area (m²/g) | Density | | | $1 \times 10^{-8}$ mole/cm² (cell) | $1 \times 10^{-5}$ mole/g TiO$_2$ |
| 1-1 | 1 | 1 | 57 | 65 | 1.83 | 1.28 | 6.75 | 6.75 | 5.27 |
| 1-2 | 12.2 | 0.8 | 65 | 65 | 1.49 | 1.82 | 9.51 | 11.89 | 5.23 |
| 2 | 12.2 | 0.8 | 52 | 51 | 1.64 | 2.00 | 11.23 | 14.03 | 5.62 |

The dye-sensitized solar cell manufactured by use of the substrate having the titanium oxide layer of Comparative Example 1-2 was 14.0 mA/cm² in photocurrent density (Jsc), 0.75V in voltage (Voc), 0.66 in fill factor (ff) and 6.9% in photoelectric conversion efficiency (η).

Comparative Example 2

The substrate having the titanium oxide layer of 12.2 μm in thickness as produced in Comparative Example 1 was dipped in an aqueous solution of 0.05 M TiCl$_4$ and hermetically sealed. Thereafter, the substrate was allowed to react at 40° C. for four hours, washed with deionized water and dried. Then, the titanium oxide layer was sintered at 500° C. for thirty minutes. The apparent porosity and the dye adsorption amount of the titanium oxide layer thus obtained are shown in Table 1.

The dye-sensitized solar cell manufactured by use of the substrate having the titanium oxide layer was 16.9 mA/cm² in photocurrent density (Jsc), 0.74V in voltage (Voc), 0.63 in fill factor (ff) and 8.0% in photoelectric conversion efficiency (η).

Example 1

60 g of titanium isopropoxide was slowly added at room temperature to a polymer solution of 20 g of polyvinyl acetate (PVAc, Mw 500,000, the product of Sigma-Aldrich, Inc.) dissolved in 350 ml of dimethylformamide. During this process, the solution was changed to a suspension due to the presence of the water component in a solvent. Then, 24 g of acetic acid as a reaction catalyst was slowly dropped into the suspension. In this process, the suspension changed transparent as the reaction proceeds. The electrospinning solution thus prepared was electrospun into titanium oxide fibers within twenty four hours after preparation thereof.

The electrospinning was performed using the electrospinning device as shown in FIG. 3. The transparent conductive substrate (of 10 cm by 10 cm in size) coated with F-doped tin oxide was used as a grounded receiver, and a metal needle connected to a variable discharge volume pump was used as an anode. A voltage of 15 KV was applied across the electrodes. While changing the ejection speed of the electrospinning solution to 10 μl/min, 20 μl/min, 30 μl/min, 50 μl/min, 100 μl/min and 200 μl/min, the electrospinning was performed until the total ejection quantity reaches 5,000 μl. Consequently, the PVAc/TiO$_2$ composite fiber layer was formed on the transparent conductive substrate coated with F-doped tin oxide. The average diameter of the fiber in the PVAc/TiO$_2$ composite fiber layer, which varies with the ejection speed, is shown in Table 2.

TABLE 2

|  | Ex. 1-1 | Ex. 1-2 | Ex. 1-3 | Ex. 1-4 | Ex. 1-5 | Ex. 1-6 |
| --- | --- | --- | --- | --- | --- | --- |
| Ejection Speed (μl/min) | 10 | 20 | 30 | 50 | 100 | 200 |
| Average Diameter (μm) | 185 | 250 | 320 | 410 | 1200 | 2100 |

Figure 5:
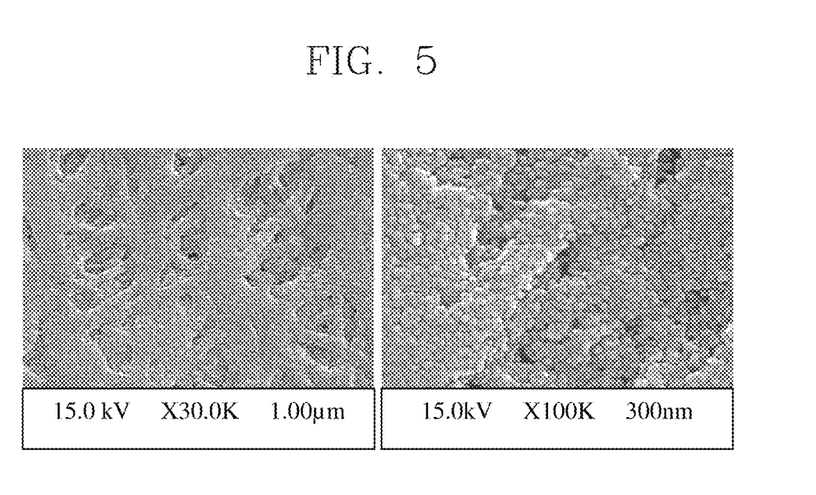
FIG. 5 shows examples of scanning electron microscopic pictures illustrating the typical morphology of an anisotropic titanium oxide nanoparticle layer formed on a transparent conductive substrate according to Example 1-1.
Figure 6:
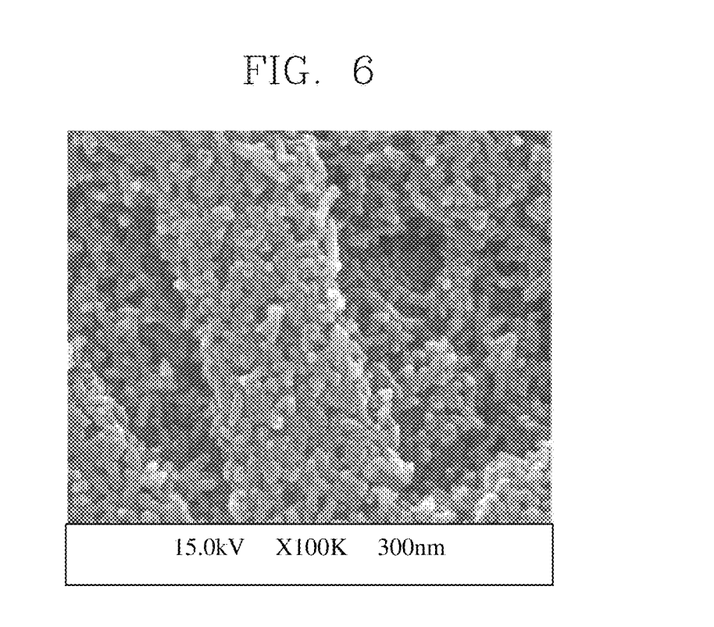
FIG. 6 shows an example of a scanning electron microscopic picture illustrating the typical morphology of an anisotropic titanium oxide nanoparticle layer formed on a transparent conductive substrate according to Example 1-3.
Figure 7:
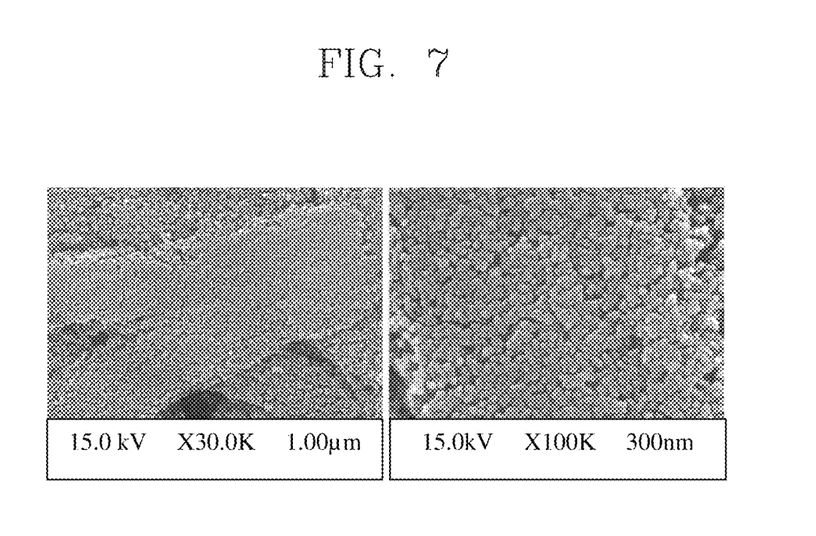
FIG. 7 shows examples of scanning electron microscopic pictures illustrating the typical morphology of an anisotropic titanium oxide nanoparticle layer formed on a transparent conductive substrate according to Example 1-5.
Figure 8:
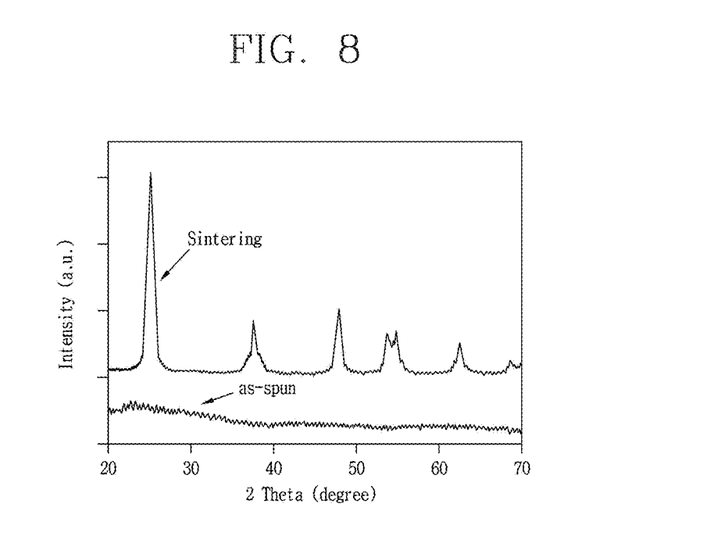
FIG. 8 illustrates an X-ray diffraction curve of an anisotropic titanium oxide nanoparticle layer produced according to Example 1-3.

The PVAc/TiO$_2$ composite fiber layer deposited on the transparent conductive substrate by electrospinning was compressed at 120° C. for ten minutes under a pressure of about 1.5 ton and then sintered at 500° C. for thirty minutes, thereby forming the anatase-type titanium oxide nanoparticle layer free from any polymer. The typical morphology of the nanoparticles in the titanium oxide nanoparticle layers formed on the transparent conductive substrates is illustrated in FIGS. 5 through 7 (which correspond to Examples 1-1, 1-3 and 1-5, respectively). FIG. 8 illustrates an X-ray diffraction curve of the titanium oxide nanoparticle layer produced according to Example 1-3. FIG. 9 shows high-resolution transmitting electron microscopic pictures of the titanium oxide nanoparticle layer produced according to Example 1-3. It can be seen in FIGS. 8 and 9 that the titanium oxide nanoparticles are formed of anatase-type titanium oxide monocrystals. The apparent porosity and dye adsorption amount of the titanium oxide nanoparticle layers are shown in Table 3.

The photocurrent density (Jsc), the voltage (Voc), the fill factor (ff) and the photoelectric conversion efficiency (η) of the dye-sensitized solar cells manufactured by use of the substrates having the titanium oxide nanoparticle layers are shown in Table 4.

TABLE 4

|  | Jsc (mA/cm$^2$) | Voc (V) | ff | η (%) |
| --- | --- | --- | --- | --- |
| Ex. 1-1 | 13.4 | 0.73 | 0.72 | 7.1 |
| Ex. 1-2 | 16.1 | 0.71 | 0.70 | 8.1 |
| Ex. 1-3 | 15.5 | 0.71 | 0.71 | 7.8 |
| Ex. 1-4 | 14.3 | 0.72 | 0.71 | 7.3 |
| Ex. 1-5 | 13.9 | 0.70 | 0.70 | 7.2 |
| Ex. 1-6 | 13.8 | 0.70 | 0.70 | 7.8 |

Example 2

As in Example 1, a solution formed of 20 g of polyvinyl acetate (PVAc, Mw 500,000, a product of Sigma-Aldrich, Inc.), 60 g of titanium isopropoxide, 24 g of acetic acid and 350 ml of dimethylformamide was electrospun on a transparent conductive substrate (of 10 cm by 10 cm in size) coated with F-doped tin oxide, at an ejection speed of 20 μl/min until the total ejection quantity reaches 5,000 μl, 6,000 μl, 7,000 μl, 9,000 μl and 10,000 μl, respectively, thereby producing substrates with PVAc/TiO$_2$ composite fiber layers of different thickness. In the same manner as employed in Example 1, the composite fiber layer was compressed at 120° C. for ten minutes under a pressure of about 1.5 ton to have a final thickness of 14 μm and then sintered at 500° C. for thirty minutes, thereby forming anatase-type titanium oxide nanoparticle layer free from any polymer. The apparent porosity and dye adsorption amount of the titanium oxide nanoparticle layer are shown in Table 5.

TABLE 3

| | Titanium Oxide Layer | | | | | Total Amount of Adsorbed Dye ($1 \times 10^{-8}$ mole) | Amount of Adsorbed Dye ($1 \times 10^{-5}$ mole/g TiO$_2$) |
| --- | --- | --- | --- | --- | --- | --- | --- |
| Ex. | Thickness (μm) | Area (cm$^2$) | Porosity (%) | Specific Surface Area (m$^2$/g) | Density | TiO$_2$ Cont. ($10^{-3}$ g) | |
| 1-1 | 8.4 | 1.0 | 68 | 121 | 1.38 | 1.16 | 9.19 | 7.92 |
| 1-2 | 10.2 | 1.0 | 73 | 125 | 1.15 | 1.17 | 12.9 | 11.0 |
| 1-3 | 12.0 | 1.0 | 78 | 128 | 0.93 | 1.12 | 12.2 | 10.9 |
| 1-4 | 12.4 | 1.0 | 78 | 123 | 0.95 | 1.18 | 10.9 | 9.24 |
| 1-5 | 13.5 | 1.0 | 80 | 122 | 0.87 | 1.17 | 10.9 | 9.32 |
| 1-6 | 14.3 | 1.0 | 81 | 126 | 0.80 | 1.15 | 10.6 | 9.22 |

TABLE 5

| Ex. | Titanium Oxide Layer | | | | | | Total Amount of Adsorbed Dye ($1 \times 10^{-8}$ mole) | Amount of Adsorbed Dye ($1 \times 10^{-5}$ mole/g TiO$_2$) |
|---|---|---|---|---|---|---|---|---|
| | Thickness (μm) | Area (cm$^2$) | Porosity (%) | Specific Surface Area (m$^2$/g) | Density | TiO$_2$ Cont. ($10^{-3}$ g) | | |
| 2-1 5,000 μl | 14.0 | 1.0 | 80.5 | 123 | 0.83 | 1.16 | 10.6 | 9.14 |
| 2-2 6,000 μl | 14.1 | 1.0 | 76.9 | 116 | 0.99 | 1.39 | 12.9 | 9.28 |
| 2-3 7,000 μl | 14.0 | 1.0 | 72.3 | 113 | 1.18 | 1.65 | 14.9 | 9.03 |
| 2-4 9,000 μl | 14.2 | 1.0 | 65.1 | 120 | 1.49 | 2.11 | 18.2 | 8.63 |
| 2-5 10,000 μl | 14.3 | 1.0 | 62.2 | 117 | 1.61 | 2.30 | 19.0 | 8.26 |

The photocurrent density (Jsc), the voltage (Voc), the fill factor (ff) and the photoelectric conversion efficiency (η) of the dye-sensitized solar cells manufactured by use of the substrates having the titanium oxide nanoparticle layers are shown in Table 6.

TABLE 6

| | Jsc (mA/cm$^2$) | Voc (V) | ff | η (%) |
|---|---|---|---|---|
| Ex. 2-1 | 14.55 | 0.77 | 0.71 | 7.96 |
| Ex. 2-2 | 16.21 | 0.75 | 0.71 | 8.60 |
| Ex. 2-3 | 16.53 | 0.75 | 0.70 | 8.71 |
| Ex. 2-4 | 17.20 | 0.71 | 0.68 | 8.30 |
| Ex. 2-5 | 16.92 | 0.68 | 0.67 | 7.38 |

Example 3

As in Example 1, a solution formed of 20 g of polyvinyl acetate (PVAC, Mw 500,000, a product of Sigma-Aldrich, Inc.), 60 g of titanium isopropoxide, 24 g of acetic acid and 350 ml of dimethylformamide was electrically spun on a transparent conductive substrate (of 10 cm by 10 cm in size) coated with F-doped tin oxide, at an ejection speed of 20 μl/min, thereby forming the PVAc/TiO$_2$ composite fiber layer. In the same manner as employed in Example 1, the composite fiber layer was compressed at 120° C. for ten minutes under a pressure of about 1.5 ton to have a final thickness of 14 μm and then sintered at 500° C. for thirty minutes, thereby forming anatase-type titanium oxide nanoparticle layers of different thickness free from any polymer. The apparent porosity and dye adsorption amount of the titanium oxide nanoparticle layer are shown in Table 7.

Example 4

In the same manner employed in Comparative Example 2, the substrate having the titanium oxide nanoparticle layer as produced in Example 3 was dipped in an aqueous solution of 0.05 M TiCl$_4$ and hermetically sealed. Thereafter, the substrate was allowed to react at 40° C. for four hours, washed with deionized water and dried. Then, the titanium oxide nanoparticle layer was sintered at 500° C. for thirty minutes. The apparent porosity and the dye adsorption amount of the titanium oxide nanoparticle layer thus obtained are shown in Table 7.

TABLE 7

| Ex. | Titanium Oxide Layer | | | | | | Total Amount of Adsorbed Dye ($1 \times 10^{-8}$ mole) | Amount of Adsorbed Dye ($1 \times 10^{-5}$ mole/g TiO$_2$) |
|---|---|---|---|---|---|---|---|---|
| | Thickness (μm) | Area (cm$^2$) | Porosity (%) | Specific Surface Area (m$^2$/g) | Density | TiO$_2$ Cont. ($10^{-3}$ g) | | |
| 3-1 | 10.0 | 1.0 | 73 | 119 | 1.16 | 1.16 | 12.9 | 10.9 |
| 3-2 | 12.0 | 1.0 | 73 | 124 | 1.15 | 1.38 | 15.2 | 11.0 |
| 3-3 | 14.3 | 1.0 | 73 | 128 | 1.15 | 1.65 | 17.6 | 10.7 |
| 3-4 | 15.0 | 1.0 | 74 | 127 | 1.11 | 1.66 | 18.0 | 10.8 |
| 3-5 | 18.1 | 1.0 | 72 | 125 | 1.18 | 2.13 | 23.1 | 10.8 |
| 4-1 | 10.1 | 1.0 | 70 | 68 | 1.29 | 1.30 | 15.7 | 12.0 |
| 4-2 | 12.2 | 1.0 | 70 | 70 | 1.26 | 1.54 | 18.5 | 12.0 |
| 4-3 | 14.2 | 1.0 | 69 | 75 | 1.33 | 1.89 | 23.1 | 12.2 |
| 4-4 | 15.0 | 1.0 | 67 | 72 | 1.41 | 2.11 | 25.9 | 12.3 |
| 4-5 | 18.0 | 1.0 | 69 | 64 | 1.34 | 2.42 | 29.8 | 12.3 |

Figure 10:
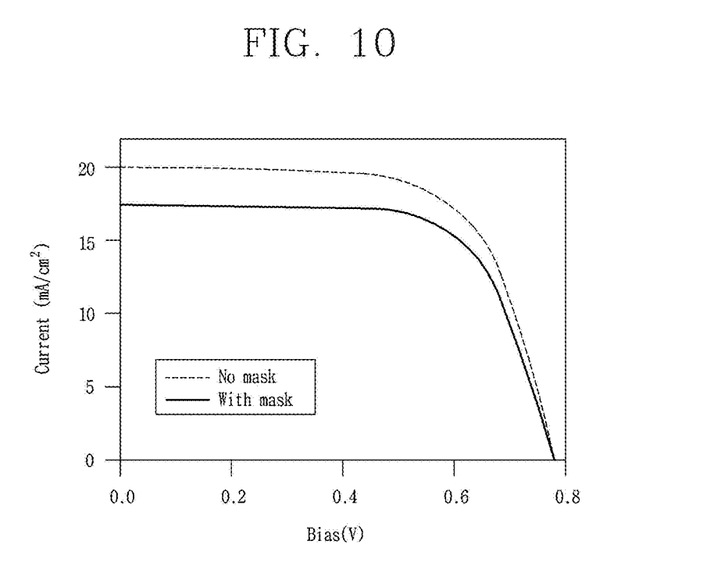
FIG. 10 is a graph showing current-voltage characteristics measured before and after the dye-sensitized solar cell manufactured according to Example 4-3 is subjected to masking.

The photocurrent density (Jsc), the voltage (Voc), the fill factor (ff) and the photoelectric conversion efficiency (η) of the dye-sensitized solar cells manufactured by use of the substrates having the titanium oxide nanoparticle layers of Examples 3 and 4 are shown in Table 8. The photoelectric conversion efficiency (η) shown in Table 8 is the result of measurement with a mask used. Table 8 reveals that the photoelectric conversion efficiency (η) in the dye-sensitized solar cell is reduced by no more than 20% even when the mask is used. FIG. 10 is a graph showing current-voltage characteristics measured before and after the dye-sensitized solar cell manufactured according to Example 4-3 is subjected to masking.

TABLE 8

|  | Jsc (mA/cm$^2$) | Voc (V) | ff | η (%) |
|---|---|---|---|---|
| Ex. 3-1 | 15.90 | 0.74 | 0.73 | 8.59 |
| Ex. 3-4 | 15.40 | 0.83 | 0.76 | 9.68 |
| Ex. 4-1 | 18.35 | 0.75 | 0.65 | 9.16 |
| Ex. 4-2 | 20.01 | 0.75 | 0.66 | 10.26 |
| Ex. 4-2* | 17.45 | 0.77 | 0.67 | 9.06 |
| Ex. 4-3 | 20.10 | 0.78 | 0.67 | 10.50 |
| Ex. 4-3* | 17.47 | 0.78 | 0.68 | 9.31 |
| Ex. 4-4 | 17.40 | 0.84 | 0.68 | 9.93 |
| Ex. 4-5 | 16.50 | 0.78 | 0.73 | 9.33 |
| Ex. 4-5* | 14.11 | 0.77 | 0.74 | 8.11 |

*Measurement after masking

Example 5

Prior to forming a titanium oxide layer by electrospinning, a blocking layer was formed on a transparent conductive substrate. The blocking layer was formed by spin-coating a butanol solution of 2M titanium bis(ethylacetoacetato)diisopropoxide ($C_{18}H_{34}O_8Ti$, Aldrich, 99.9%) on a transparent conductive substrate (10 cm by 10 cm) at 200 rpm for sixty seconds with a spin-coater (Spin-3000D, PTL 22 Korea) and then sintering the coated layer at 450° C. for thirty minutes to have an increased density. A titanium oxide layer was formed on the blocking layer in the same manner as employed in Example 3-3, thereby producing a titanium oxide substrate. The dye-sensitized solar cell manufactured by use of the titanium oxide substrate was 16.21 in photocurrent density (Jsc), 0.79 in voltage (Voc), 0.77 in fill factor (ff) and 9.86 in photoelectric conversion efficiency (η).

Example 6

A dye-sensitized solar cell was manufactured using a titanium oxide substrate in the same manner as in Example 3-3 and 5, except that a polymer gel electrolyte is used in place of the liquid electrolyte. The polymer gel electrolyte was prepared by dissolving 0.125 g of poly(vinylidene fluoride)-co-poly(hexafluoropropylene) (Kynar 2801), 0.13 g of 1-hexyl-2,3-dimethyl imidazolium iodide (Im) and 0.008 g of iodine in a mixed solvent of 0.75 g of propylene carbonate and 0.5 g of ethylene carbonate at 80° C. The dye-sensitized solar cell manufactured by use of the titanium oxide substrate was 15.54 in photocurrent density (Jsc), 0.78 in voltage (Voc), 0.73 in fill factor (ff) and 8.85 in photoelectric conversion efficiency (η). The photoelectric conversion efficiency of the dye-sensitized solar cell is 89.9% of that available in Example 5 using the liquid electrolyte, which suggests that its reduction is very low.

Example 7

Figure 11:
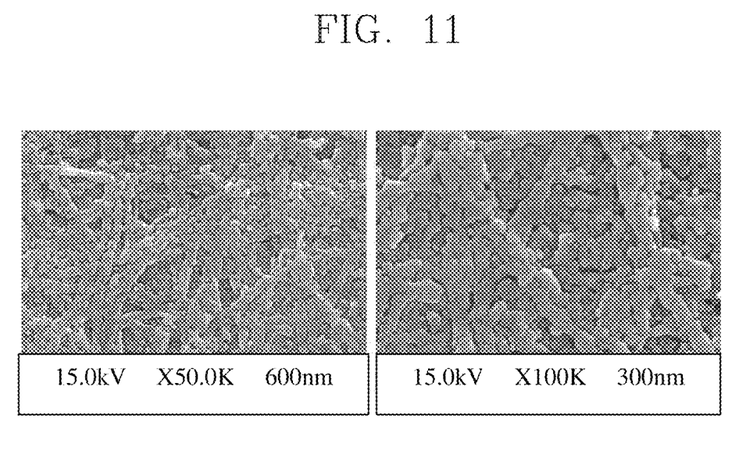
FIG. 11 shows scanning electron microscopic pictures illustrating the morphology of a titanium oxide nanoparticle layer produced according to Example 5.

7.5 g of polyvinylpyrrolidone (having a molecular weight of 1,300,000) was dissolved in 140 g of ethanol. 15 g of titanium propoxide was added to the solution thus obtained and 15 g of acetic acid was added thereto as a reaction catalyst, thereby allowing the titanium propoxide to be solated. Thereafter, electrospinning was performed in the same manner as employed in Example 1. At this time, an ultrafine composite fiber layer containing titanium oxide was formed on a transparent conductive substrate by electrospinning 5,000 μl of the solution at an ejection speed of 10 μl/min. In the same manner as employed in Example 1, the composite fiber layer was compressed at 150° C. for ten minutes under a pressure of about 0.2 ton and then sintered at 500° C. for thirty minutes, thereby producing a substrate having an anatase-type titanium oxide nanoparticle layer of 4.5 μm in thickness free from any polymer. FIG. 11 illustrates the titanium oxide nanoparticle layer thus obtained.

In the same manner as employed in Comparative Example 2, a substrate having the same titanium oxide layer as formed in Example 5 was dipped in an aqueous solution of 0.05 M $TiCl_4$ and hermetically sealed. Thereafter, the substrate was kept at 40° C. for four hours, washed with deionized water and dried. Then, the titanium oxide layer was sintered at 500° C. for thirty minutes. The photocurrent density (Jsc), the voltage (Voc), the fill factor (ff) and the photoelectric conversion efficiency (η) of the dye-sensitized solar cell thus manufactured are shown in Table 9.

TABLE 9

|  | Jsc (mA/cm$^2$) | Voc (V) | ff | η (%) |
|---|---|---|---|---|
| Ex. 5-1 | 8.87 | 0.73 | 0.71 | 4.56 |
| Ex. 5-2 (TiCl$_4$) | 11.71 | 0.73 | 0.66 | 5.64 |

According to certain embodiments described above, a metal oxide layer exhibits high dye adsorption performance and high electron transportation characteristic, thereby making it possible to greatly increase the photoelectric conversion efficiency of a dye-sensitized solar cell. Furthermore, due to the high porosity of the metal oxide layer, it may be possible to maintain the photoelectric conversion efficiency attained by use of a gel-type electrolyte or a solid electrolyte equal to or greater than 80% of that available when a liquid electrolyte is used.

In a dye-sensitized solar cell according to examples described herein, the photoelectric conversion efficiency measured through the use of a mask is reduced by not more than 20% as compared to that available when the mask is not in use. In the case of a conventional dye-sensitized solar cell, however, the photoelectric conversion efficiency measured through the use of a mask is reduced by 20% or more.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A dye-sensitized solar cell comprising:
   a semiconductor electrode, comprising:
      a substrate; and
      a metal oxide layer formed on the substrate, the metal oxide layer comprising monocrystalline, anisotropic metal oxide nanoparticles and a dye adsorbed to the metal oxide nanoparticles, wherein crystal faces are exposed on surfaces of the metal oxide nanoparticles;
   a counter electrode spaced apart from the semiconductor electrode; and
   an electrolyte provided between the semiconductor electrode and the counter electrode, wherein:

a density of the metal oxide layer defined by a ratio of a weight of the metal oxide nanoparticles per unit volume of the metal oxide layer is in a range of 0.5 g/cm$^3$ to 1.8 g/cm$^3$, and the dye absorption amount per unit gram of the metal oxide nanoparticles is in a range of $6\times10^{-5}$ to $5\times10^{-4}$ mole.

2. The dye-sensitized solar cell of claim 1, wherein the metal oxide nanoparticles have a diameter in a range of 5 nm to 20 nm and an aspect ratio of 1:50.

3. The dye-sensitized solar cell of claim 1, wherein a porosity of the metal oxide layer is in a range of 65% to 90%.

4. The dye-sensitized solar cell of claim 1, wherein the metal oxide layer has a thickness in a range of 5 μm to 20 μm.

5. The dye-sensitized solar cell of claim 1, wherein the metal oxide nanoparticles further comprise one member selected from the group consisting of titanium oxide, zinc oxide, tin oxide, niobium oxide, tungsten oxide, strontium oxide, zirconium oxide and a mixture thereof.

6. The dye-sensitized solar cell of claim 5, wherein:
the metal oxide nanoparticles further comprise anatase-type titanium oxide nanoparticles; and
the semiconductor electrode further comprises a rutile-type titanium oxide layer formed on the metal oxide layer.

7. The dye-sensitized solar cell of claim 1, wherein the semiconductor electrode further comprises a blocking layer disposed between the substrate and the metal oxide layer.

8. The dye-sensitized solar cell of claim 1, wherein the electrolyte comprises one of a liquid electrolyte, a gel-type electrolyte, and a solid electrolyte.

9. A method for manufacturing a dye-sensitized solar cell, the method comprising:
preparing a semiconductor electrode, comprising:
spinning a mixed solution of a metal oxide precursor and a polymer to form ultrafine composite fibers made of the metal oxide precursor and the polymer;
thermally compressing the formed ultrafine composite fibers such that the polymer is melted and fine fibrils of the ultrafine composite fibers are crushed;
sintering the thermally-compressed ultrafine composite fibers to remove the polymer therefrom and to form a metal oxide layer including monocrystalline, anisotropic metal oxide nanoparticles having crystal faces that are regularly exposed on surfaces thereof; and
allowing a dye to be adsorbed to the metal oxide nanoparticles;
preparing a counter electrode; and
providing an electrolyte between the semiconductor electrode and the counter electrode, wherein
a density of the metal oxide layer defined by a ratio of a weight of the metal oxide nanoparticles per unit volume of the metal oxide layer is in a range of 0.5 g/cm$^3$ to 1.8 g/cm$^3$ and dye absorption amount per unit gram of the metal oxide nanoparticles is in a range of $6\times10^{-5}$ to $5\times10^{-4}$ mole.

10. The method of claim 9, wherein the density of the metal oxide layer is controlled by:
1) adjusting a weight ratio of the metal oxide precursor and the polymer in the mixed solution;
2) adjusting a diameter of the ultrafine composite fibers by changing at least one of a viscosity and an ejection speed of the mixed solution;
3) adjusting a thermal compression ratio; or
4) using at least two of methods 1) to 3) in combination.

11. The method of claim 10, wherein the weight ratio of the metal oxide precursor to the polymer is in a range of 0.1 to 20.

12. The method of claim 10, wherein the diameter of the ultrafine composite fibers is in a range of 10 nm to 10,000 nm.

13. The method of claim 10, wherein the thermally compressing is performed at a compression ratio of 0.1 to 20 ton per 100 cm$^2$ at a temperature not less than a glass transition temperature (Tg) of the polymer but no greater than a melting temperature (Tm) of the polymer.

14. The method of claim 9, wherein the sintering is performed at a temperature of 400° C. to 600° C.

15. The method of claim 9, wherein the metal oxide precursor contains ions of titanium, zinc, tin, niobium, tungsten, strontium or zirconium, and is capable of forming titanium oxide, zinc oxide, tin oxide, niobium oxide, tungsten oxide, strontium oxide or zirconium oxide when mixed with the polymer, spun and then sintered.

16. The method of claim 9, wherein the polymer is at least one selected from the group consisting of polyurethane (PU), polyether urethane, polyurethane copolymer, cellulose acetate, cellulose acetate butyrate, cellulose acetate propionate, polymethyl methacrylate (PMMA), polymethyl acrylate (PMA), polyacrylic copolymer, polyvinyl acetate (PVAc), polyvinyl acetate copolymer, polyvinyl alcohol (PVA), polyfurfuryl alcohol (PFFA), polystyrene (PS), polystyrene copolymer, polyethylene oxide (PEO), polypropylene oxide (PPO), polyethylene oxide copolymer, polypropylene oxide copolymer, polycarbonate (PC), polyvinylchloride (PVC), polycaprolactone (PCL), polyvinylpyrrolidone (PVP), polyvinylidene fluoride (PVdF), polyvinylidene fluoride copolymer and polyamide, and copolymers thereof.

17. The method of claim 9, wherein the spinning is performed by an electrospinning method, a melt-blown method using electric fields, an electro-blown method, a flash spinning method using electric fields, or an electrostatic melt-blown method.

* * * * *